United States Patent
Alberg

(10) Patent No.: US 7,335,721 B2
(45) Date of Patent: Feb. 26, 2008

(54) POLYTETRAFLUOROETHYLENE TREATMENT

(75) Inventor: Michele J. Alberg, Minnetonka, MN (US)

(73) Assignee: Advanced Technology Materials, Inc., Danbury, CT (US)

(*) Notice: Subject to any disclaimer, the term of this patent is extended or adjusted under 35 U.S.C. 154(b) by 0 days.

(21) Appl. No.: 11/452,153

(22) Filed: Jun. 13, 2006

(65) Prior Publication Data

US 2006/0235197 A1    Oct. 19, 2006

Related U.S. Application Data

(63) Continuation of application No. 10/606,521, filed on Jun. 26, 2003, now Pat. No. 7,067,616.

(51) Int. Cl.
*C08F 6/00*    (2006.01)

(52) U.S. Cl. .............. 528/503; 264/45.5; 264/115; 428/421; 528/481; 528/501

(58) Field of Classification Search ............ 428/421; 528/503, 501, 481; 264/115, 455
See application file for complete search history.

(56) References Cited

U.S. PATENT DOCUMENTS

| | | | |
|---|---|---|---|
| 3,432,511 A * | 3/1969 | Reiling ................. 526/254 |
| 3,975,481 A | 8/1976 | Baumgaertner | |
| 4,220,511 A * | 9/1980 | Derbyshire ................. 522/4 |
| 4,539,113 A * | 9/1985 | Tomita et al. ............ 210/323.2 |
| 5,215,662 A * | 6/1993 | Johnson et al. ........ 210/500.38 |
| 5,377,708 A * | 1/1995 | Bergman et al. ............ 134/105 |
| 5,597,873 A * | 1/1997 | Chambers et al. ......... 525/330.1 |
| 5,972,441 A * | 10/1999 | Campbell et al. .......... 428/34.1 |
| 7,067,616 B2 | 6/2006 | Alberg | |

FOREIGN PATENT DOCUMENTS

WO    WO 2005/003189 A1    1/2005

* cited by examiner

*Primary Examiner*—Peter D. Mulcahy
*Assistant Examiner*—Henry S. Hu
(74) *Attorney, Agent, or Firm*—Vincent K. Gustafson; Intellectual Property/ Technology Law; David M. Shofi

(57) ABSTRACT

One or more PTFE films are heated to greater than 150 degrees centigrade (C) and for a time greater than 20 hours, then the PTFE films are cooled. The PTFE films may be heated to temperatures greater than 200° C. and less than 250° C. and most preferably heated to a temperature of about 228° C. The PTFE films may be kept at a temperature for greater than 50 hours or most preferably kept at a temperature for around 100 hours. The PTFE films may be heat processable PTFE fluoropolymer films and may have a number of heat affected zones. The heat affected zones may be created before or after heat treating. The heat affected zones are generally caused by welding two or more PTFE films together, usually under-pressure. An "optimal" temperature and "optimal" time period are determined at which heat processed polytetrafluoroethylene (PTFE) fluoropolymers should be heat treated.

22 Claims, 10 Drawing Sheets

DOT PLOT OF ANNEALED TEST SAMPLES AND CONTROL (NO ANNEAL)

DOT PLOT OF PARTICLE COUNTS CAUSED BY HEAT-TREATED PTFE LINERS

POLYTETRAFLUOROETHYLENE TREATMENT

STATEMENT OF RELATED APPLICATION(S)

This application claims benefit and is a continuation of U.S. patent application Ser. No. 10/606,521 filed Jun. 26, 2003 now U.S. Pat. No. 7,067,616 and entitled "Polytetrafluoroethylene Treatment," which application is also incorporated by reference herein.

FIELD OF THE INVENTION

The present invention relates to polytetrafluoroethylene (PTFE) and, more particularly, to heat treatment of PTFE.

BACKGROUND OF THE INVENTION

Polytetrafluoroethylene (PTFE) is widely used in industrial and biomedical applications because PTFE has a number of beneficial properties. For instance, PTFE is commonly considered to be chemically inert. Because of this and other properties of PTFE, some companies in the semiconductor processing industry form PTFE into a "liner" that is used to line a bottle that is then used to store chemicals.

A liner is formed in the following manner. First, a modified PTFE powder is made into a billet, which is a filled cylinder that is compressed. The billet is baked until the particles coalesce and stick together. The billet is formed into a film through a process called skiving, which planes off a thin layer of material. The skiving process is similar to peeling an apple. The end result of the skiving process is one or more sheets of PTFE material. Each sheet is commonly called a film.

A liner is formed by "welding" portions of cleaned PTFE films to make a four-sided, two-dimensional bag with a spout called a fitment. The spout is also welded onto the liner. The liner is then used to line a polyethelene overpack, which is what gives the liner structural support, and the final product is a PTFE-lined bottle.

Chemicals are stored in the PTFE-lined bottle and removed or placed into the bottle via the fitment. The chemicals stored in these bottles are typically ultra-pure and the PTFE liners, being chemically inert, generally do not chemically react with the stored chemicals.

Nonetheless, it has been determined that PTFE liners may cause an increase in observed particles for liquids stored in contact with the PTFE liners. For instance, pure water can be pumped into a bottle having a PTFE liner, the bottle inverted a number of times, and the pure water pumped out of the bottle. The water pumped out of the bottle is passed through a particulate counter, which counts particles in a certain size range. For conventional PTFE-lined bottles, the particle count can vary widely, as judged by the standard deviation of the particle count. Lot variability, where PTFE liners are made from different lots of PTFE films, may be partially responsible for the high standard deviation of the particle count. Moreover, the particle count tends to be relatively high, especially when it is considered that it would be beneficial for PTFE liners to cause no particle count.

Thus, conventional techniques for processing PTFE liners fail to substantially prevent relatively high particle counts and high standard deviation of those particle counts. Therefore, a need exists for improving PTFE films and liners and other products made from PTFE films.

SUMMARY OF THE INVENTION

In the present invention, polytetrafluoroethylene (PTFE) material, generally PTFE films are heat treated in order to reduce particulate shedding by the PTFE films.

In one embodiment, a container is adapted to contain a substantially contaminant-free substance, the container comprising a polytetrafluoroethylene material having a particle count character reduced by application of an elevated temperature thereto. The elevated temperature, which is preferably above a glass transition temperature of the polytetrafluoroethylene material, is preferably between about 130° and about 260° C., and the application of the elevated temperature is for between about 20 hours and about 100 hours. The container may comprise a liner, and the liner may comprise a film comprising the polytetrafluoroethylene material.

In another embodiment, one or more PTFE films may be are heated to greater than about 150 degrees centigrade (C) and for a time greater than about 20 hours, then the PTFE films are cooled. The PTFE films may be heated to temperatures greater than 200° C. and less than 250° C. and most preferably heated to a temperature of about 228° C. The PTFE films may be kept at an elevated temperature for greater than about 50 hours or most preferably kept at a temperature for around 100 hours. The PTFE films may be heat processable PTFE fluoropolymers and may have a number of heat affected zones. The heat affected zones may be created before or after heat treating. The heat affected zones are caused by heating PTFE films to temperatures near the melting temperature of the PTFE films and are generally caused by welding two or more PTFE films together, usually under pressure for a period of time less than the heat treating described above.

In another embodiment, an "optimal" temperature and "optimal" time period may be determined at which heat processed polytetrafluoroethylene (PTFE) fluoropolymers should be heat treated. A number of temperatures, time periods, and lots containing heat processable PTFE fluoropolymer films are selected. The heat processable films are separated into a number of sets, which also have temperatures and time periods associated therewith. The heat processed PTFE fluoropolymer films for each of the sets may be subjected to the associated temperature for the associated time period. Particle counts for the heat processed PTFE fluoropolymer films are determined and regression analysis is performed on the particle counts to determine the optimal temperature and optimal time period. The heat processable PTFE fluoropolymer films may be welded before or after the described heat treatment.

A more complete understanding of the present invention, as well as further features and advantages of the present invention, will be obtained by reference to the following detailed description and drawings.

DETAILED DESCRIPTION OF PREFERRED EMBODIMENTS

As described above, conventional techniques for processing polytetrafluoroethylene (PTFE) material such as PTFE liners result in relatively high particle counts and/or high standard deviation of those particle counts. That is, such PTFE material may be referred to as having a high particle count character. Embodiments of the present invention may be employed to reduce the particle count character of PTFE material. In fact, embodiments described herein may reduce the particle count character and the standard deviation thereof by factors greater than about ten. It should be noted that particle counting systems may also count "microbubbles" or other anomalies as "particles" accounted for in establishing a particle count or the particle count character of a material. The term "particle," as used herein, is intended to encompass whatever can be construed to be a "particle" by a conventional particle counting system.

Figure 1:
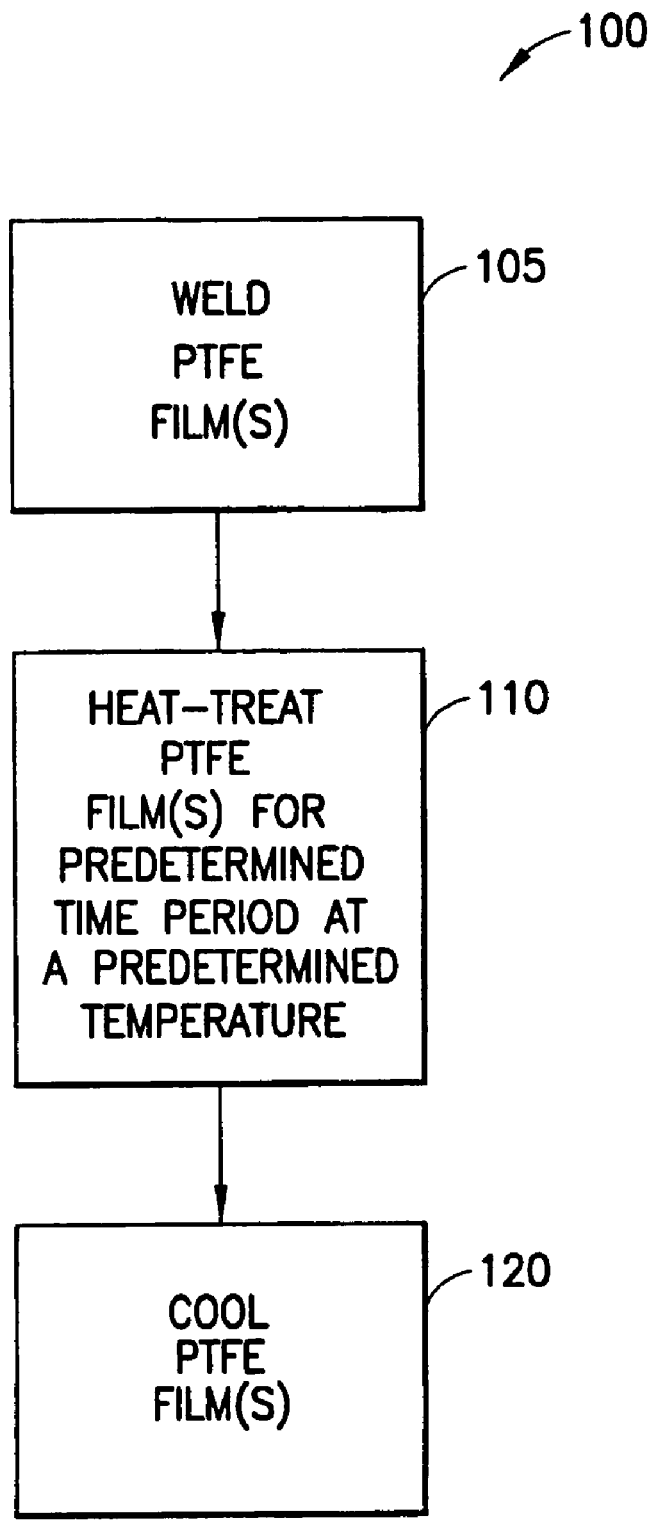
FIG. 1 is a flow-chart depicting an exemplary method for heat treating PTFE films.

Referring now to FIG. 1, a method 100 is shown for heat treating PTFE films in order to reduce particulate shedding. Method 100 may be employed where PTFE films are to be placed in contact with liquid substances. The method 100 may be used whenever particle count reduction is desirable. This may also include situations where PTFE films are to contact non-liquids such as substances.

In step 105, a PTFE film is welded. This step is optional. In general, however, most liners made of PTFE will be welded. Welding for PTFE films is a process that melts and joins separate PTFE film portions generally under an amount of pressure. As described in more detail below, welding occurs at about the melting point of the particular PTFE film employed.

Accordingly, in one embodiment, welding may include exposing the PTFE films to between about 370 C and about 430 C for between about 5 and about 15 seconds. A pressure of between about 60 psi and about 100 psi may be applied. Additionally, the PTFE films may be cooled for between about 5 and about 15 seconds at a constant pressure before further processing as described below.

Usually, the PTFE film is a heat processable PTFE fluoropolymer however, any PTFE may be employed. The welding described above produces one or more heat affected zones which, left untreated may be prone to contribute to particle shedding. However, as described further herein, the heat affected zones and PTFE film generally may be treated to reduce such occurrence.

A heat affected zone is caused by heating the PTFE film to temperatures near or at, the melting point of the molecular components in the film. Generally, a heat affected zone is caused by heating the PTFE film to within about 15° C. of the melting point of the PTFE film. Portions of the film tend to melt at different temperatures. For example, crystalline portions of the film may melt at temperatures higher than the melting temperature associated with the PTFE film, while amorphous portions of the film may melt at temperatures lower than the melting temperature associated with the PTFE film. Thus, a heat affected zone may be created even if the melting temperature associated with the PTFE film is never actually reached. Additionally, in order to completely weld two pieces of PTFE film together, at least the melting point of the PTFE films should be reached and temperatures somewhat above the melting point may be beneficial. Heat affected zones are beneficially affected by the processes of the present invention, as is PTFE film without heat affected zones.

Generally, step 105 includes multiple welding steps, such that a complete PTFE liner is formed. As described above, a PTFE liner is usually a four-sided, two-dimensional bag with a spout called a fitment. The spout is also welded onto the liner. Thus, step 105 will generally include several welding steps.

With continued reference to FIG. 1, and as described above, in step 110, one or more PTFE films may be heat treated by placing the films at a predetermined temperature for a predetermined time period. In this manner, particle shedding and particle counts, as described above, may be minimized. There are a number of different temperatures and time periods that may be beneficial, but there are certain temperatures and time periods that show particular benefit. Particular techniques for determining an optimum temperature and time period are described in reference to FIGS. 2 through 10. Temperatures above the glass transition temperature of the material (about 130° C. for many PTFE films) will begin to produce lower particulate shedding, as shown in more detail below. The heat treating process becomes particularly effective as temperatures exceeding 150° C. are applied. As shown in more detail below, even higher temperatures are beneficial, until an optimal temperature is reached, but too high of a temperature can lead to increased particulate shedding as compared to the optimum temperature. Nonetheless, temperatures higher than the optimum temperature can be used if desired, as particle shedding may still be decreased with higher temperatures.

Generally, the predetermined temperature in step 110 is above about 150 degrees centigrade (C), more preferably above about 200° C., and most preferably about 228° C. Higher temperatures may also be used. It is preferable that temperatures be less than about 260° C. It should also be noted that a temperature range, such as 230° C. ±20° C., may be used. Additionally, films may be applied in a discontinuous or periodic manner. That is the PTFE material may be heated to the predetermined temperature and cooled to, for instance, room temperature, then reheated to the initial predetermined temperature. However, in order to minimize total treatment time, the PTFE films may be continuously maintained or an alternate elevated temperature at the predetermined temperature for a particular time period, as reheating and cooling makes the total time required to heat treat PTFE films longer.

Concerning the predetermined time period, as shown in more detail below, a recommended time period is greater than about 20 hours, a more preferred time period is greater than about 50 hours and a most preferred time period is about 100 hours. While shorter or longer time periods may be used, a time period of about 100 hours, as determined through the techniques given below, should provide the smallest amount of particulate shedding and the standard deviation thereof in the shortest time period. It should be noted that step 100 can take place after step 120, if desired.

Now that an overview of exemplary heat treatment techniques for PTFE films has been described, techniques for determining appropriate temperature and time periods for any particular PTFE film or, more likely, set of PTFE films will be described.

Figure 2:
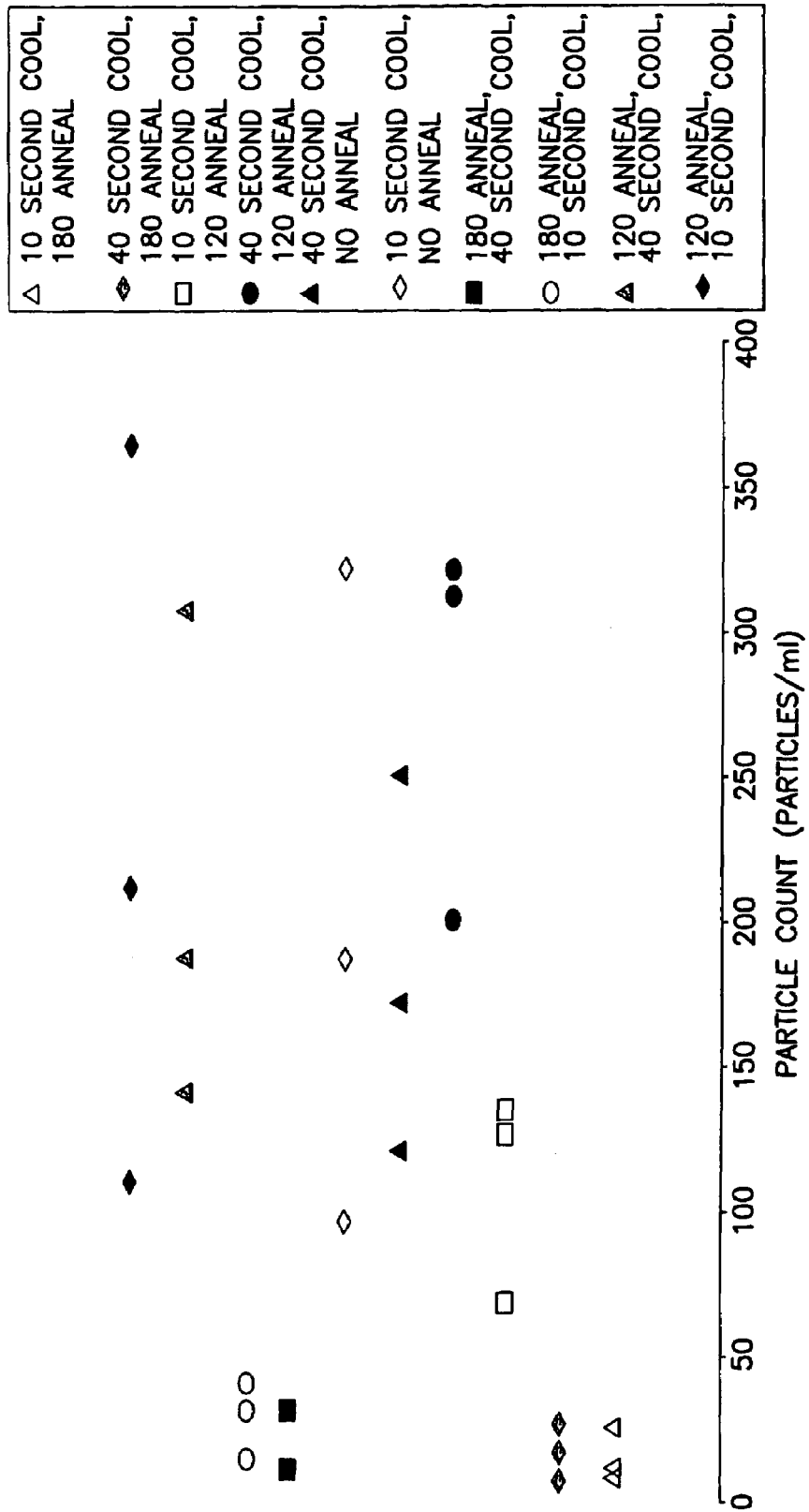
FIG. 2 is a dot plot of annealed test samples and controls that illustrate effects, in terms of particle count, of heat treating on PTFE liners.

Referring now to FIG. 2, a dot plot of annealed test samples and controls is shown. This plot illustrates effects, in terms of particle count, of heat treating on PTFE liners. PTFE liners were filled with photoresist, inverted five times and counted at 0.2 microns 16 hrs after filling. The x-axis units are particles per milliliter (particles/ml) at 0.2 microns. The legend at the right of FIG. 2 contains a description of each set of samples tested. Each sample in a set of samples was a number of heat processable PTFE fluoropolymer films that were welded together into a liner. In this example, there are three PTFE liners per set. The welds were performed by using a welding machine that presses two PTFE films together, along a relatively thin line or set of lines, for a predetermined time at a predetermined temperature, where the predetermined temperature is equal to or greater than the melting point of the PTFE films. The "10 second cool" is a 10 second period of time used to cool the welded PTFE films to a predetermined cool temperature. Similarly, the "40 second cool" is a 40 second period of time used to cool the welded PTFE films to a predetermined cool temperature.

The samples, as shown in legend, were as follows: (1) a test set of PTFE liners with a 10-second cool followed by a 180° C. heat treat for four days; (2) a test set of PTFE liners with a 40-second cool followed by a 180° C. heat treat for four days; (3) a test set of PTFE liners with a 10-second cool followed by a 120° C. heat treat for four days; (4) a test set of PTFE liners with a 40-second cool followed by a 120° C. heat treat for four days; (5) a control set of PTFE liners with welds produced with a 10-second cool; (6) a test set of PTFE liners with welds produced with 40-second cool; (7) a test set of PTFE liners with a 180° C. heat treat for four days followed by a 10-second re-weld and a 40-second cool; (8) a test set of PTFE liners with a 180° C. heat treat for four days followed by 40-second re-weld and a 10-second cool; (9) a test set of PTFE liners with a 120 C heat treat for four days followed by a 10-second re-weld and a 40-second cool; and (10) a test set of PTFE liners with a 120° C. heat treat for four days followed by 40-second re-weld and a 10-second cool.

The dots plotted for each set of PTFE liners in FIG. 2 are allotted their own row in the figure. For instance, the dots plotted for the set entitled "10 second cool, 180° anneal" are shown on the row nearest the axis for particle count. Similarly, the dots plotted for the set entitled "40 second cool, 180° anneal" are shown on the second row from the axis for particle count.

FIG. 2 shows, among other things, that the effect of the amount of cooling time after welding is minimal, and the 180° C. anneal produces PTFE liners having the lowest particle count for the temperatures selected.

Figure 3:
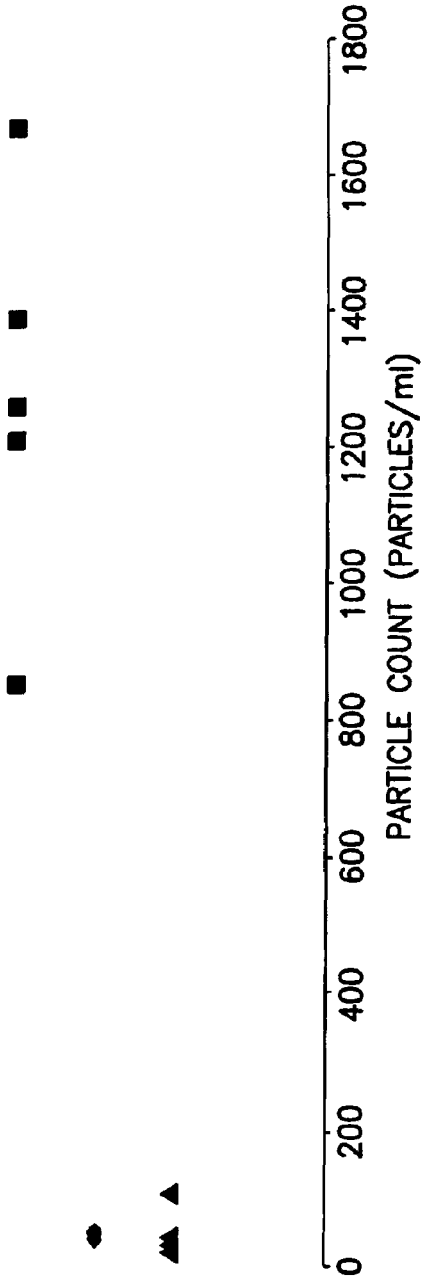
FIG. 3 is a dot plot of distilled water testing of control and annealed liners with one and five inversions.

Because the amount of agitation (i.e., inverting a filled PTFE liner five times) used in FIG. 2 is not typical in quality control testing, and because particle counts are generally taken using distilled water, samples were prepared to measure the effects of heat treatment on PTFE liners that were tested in DI water with one and five inversions. The heat treatment was performed at 180° C. for five days. The sample PTFE liners were filled and particle tested with one hour of filling at 0.2 microns. The results are shown in FIG. 3, which is a dot plot of distilled water testing of control and annealed liners. FIG. 3 shows, among other things, that the annealed PTFE liners cause smaller particle counts than the corresponding control PTFE liners.

To determine the optimum settings for liner heat treatment, it is beneficial to select PTFE liners from a number of lots of liners. PTFE liners from each liner lot can then be heated for different time periods and for different temperatures. Thus, "sets" can be determined, where each set has a number of PTFE liners from certain lots, a selected temperature and a selected time period. The particle counts, for a chosen number of inversions of the PTFE liners, are then determined for the sets of liners and a regression analysis on the particle counts will determine an "optimal" temperature and "optimal" time period. The optimal values are theoretical and may differ slightly from an actual "optimal" temperature or time period. An example of this "optimization" technique follows.

Sample PTFE liners were prepared from three lots of liners. Each liner lot was heated for 20, 95, or 170 hours at 180° C., 220° C., or 260° C. Sample PTFE liners were filled with photoresist, inverted five times and particle counted at 0.2 microns at 16 hrs after filling.

Based on the results of the optimization technique for the three lots of liners tested, it appears that liner lot and heat treating temperature are the biggest contributors to particle levels and particle level variability, as indicated by the standard deviation. It appears that the relationships between liner lot, heat treating temperature, particle levels and standard deviation thereof are nonlinear with several second order interactions. If time is held constant at 20 hours, the liner lot and temperature curves (for particle count) look like what is shown in FIG. 4.

Figure 4:
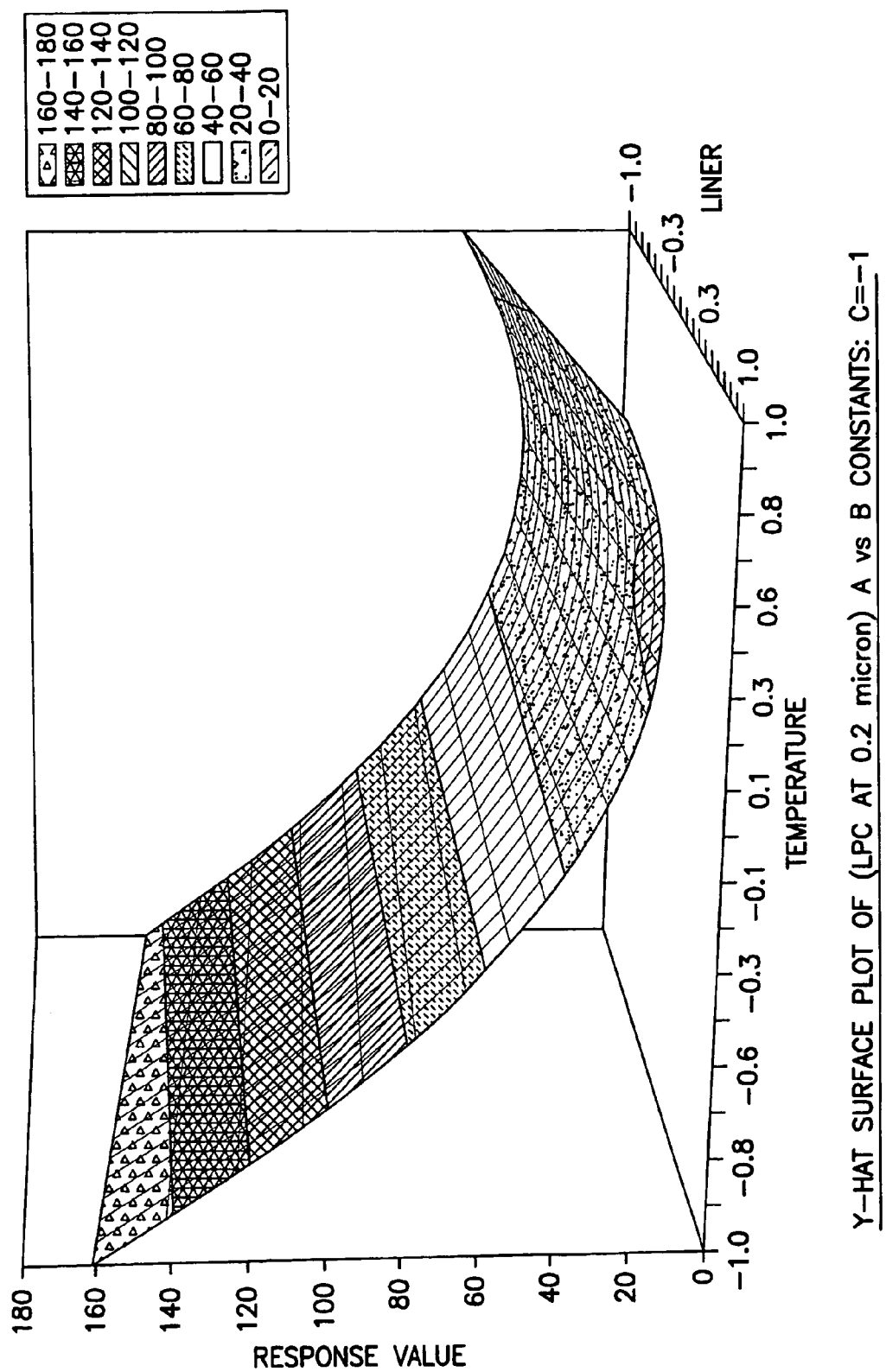
FIG. 4 is a calculated plot, based on actual data, showing how a particle count varies with heat treatment temperature for a number of liners held at selected temperatures for about 20 hours.

FIG. 4 is a calculated plot, based on actual data, showing how a particle count varies with heat treatment temperature for a number of liners held at a selected temperature for 20 hours. In the example of FIG. 4, actual data from different temperatures and liner lots were determined and placed into a program that used the data to determine the plot shown in FIG. 4. Thus, the plot shown in FIG. 4 is calculated based on actual data.

Regarding the temperatures shown in FIG. 4, the temperatures are as follows: −1 is equivalent to 180° C.; 0 is equivalent to 220° C.; and 1 is equivalent to 260 C. The response value is the particle count, in particles/ml. Fifteen PTFE liners were used from three different liner lots (lots 1, 0, and −1 in the figure). Thus, the plot of FIG. 4 reaches a low at about 236° C. (0.4 times 40 plus 220° C.), although this varies somewhat with liner lot.

Figure 5:
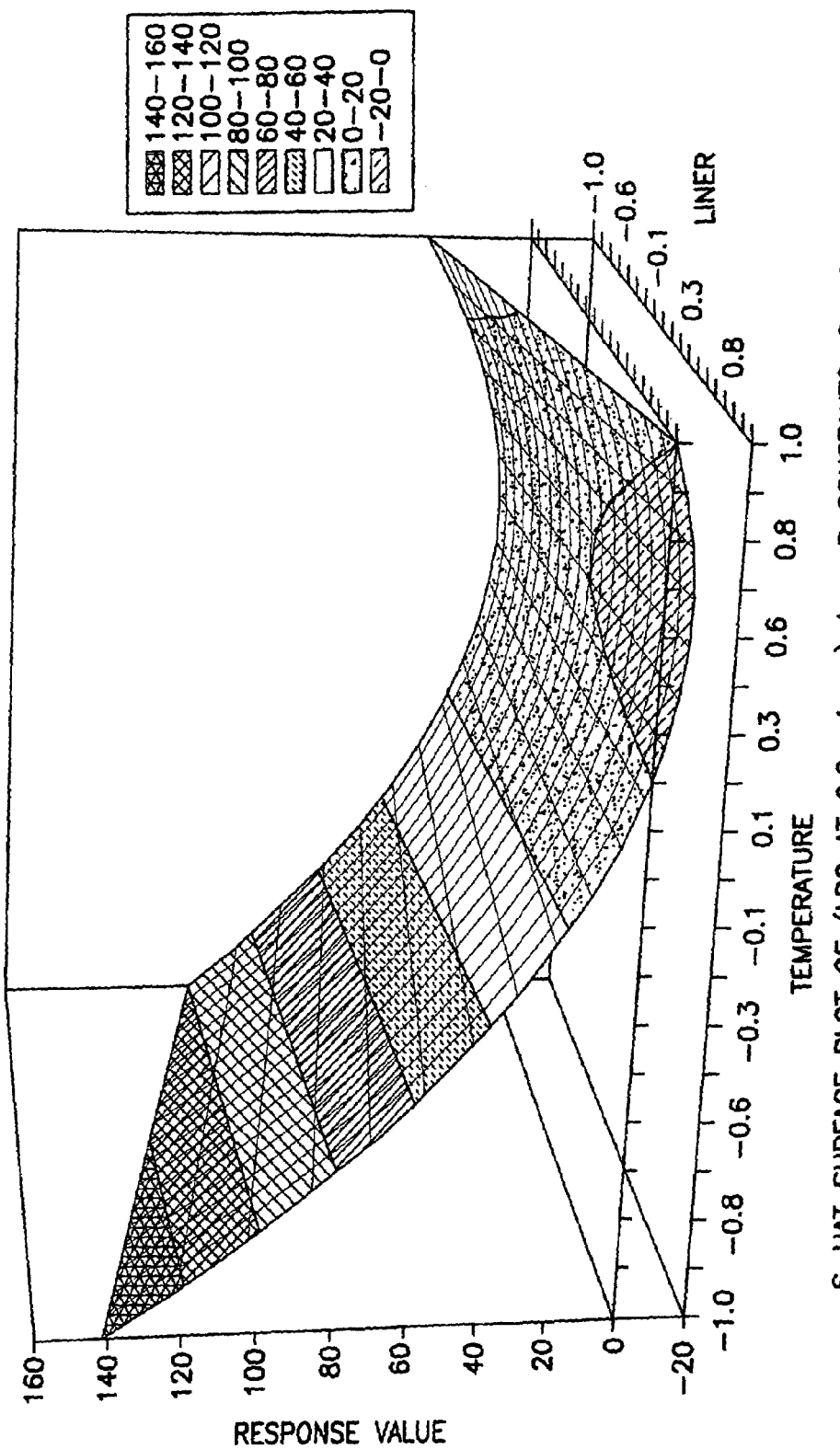
FIG. 5 is a calculated plot, based on actual data, showing how a standard deviation of a particle count varies with heat treatment temperature for the liners of FIG. 4.

FIG. 5 is a calculated plot, based on actual data, showing how a standard deviation of a particle count varies with heat treatment temperature for the liners used in FIG. 4. The temperatures, response values, and liner lots are the same as in FIG. 4. As with FIG. 4, the plot in FIG. 5 is calculated using actual data, and the data is the same used in FIG. 4. FIG. 5 shows that standard deviation of particle count is affected by heat treatment and reaches a low at about 244° C. (0.6 times 40 plus 220° C.), depending on liner lot.

Figure 6:
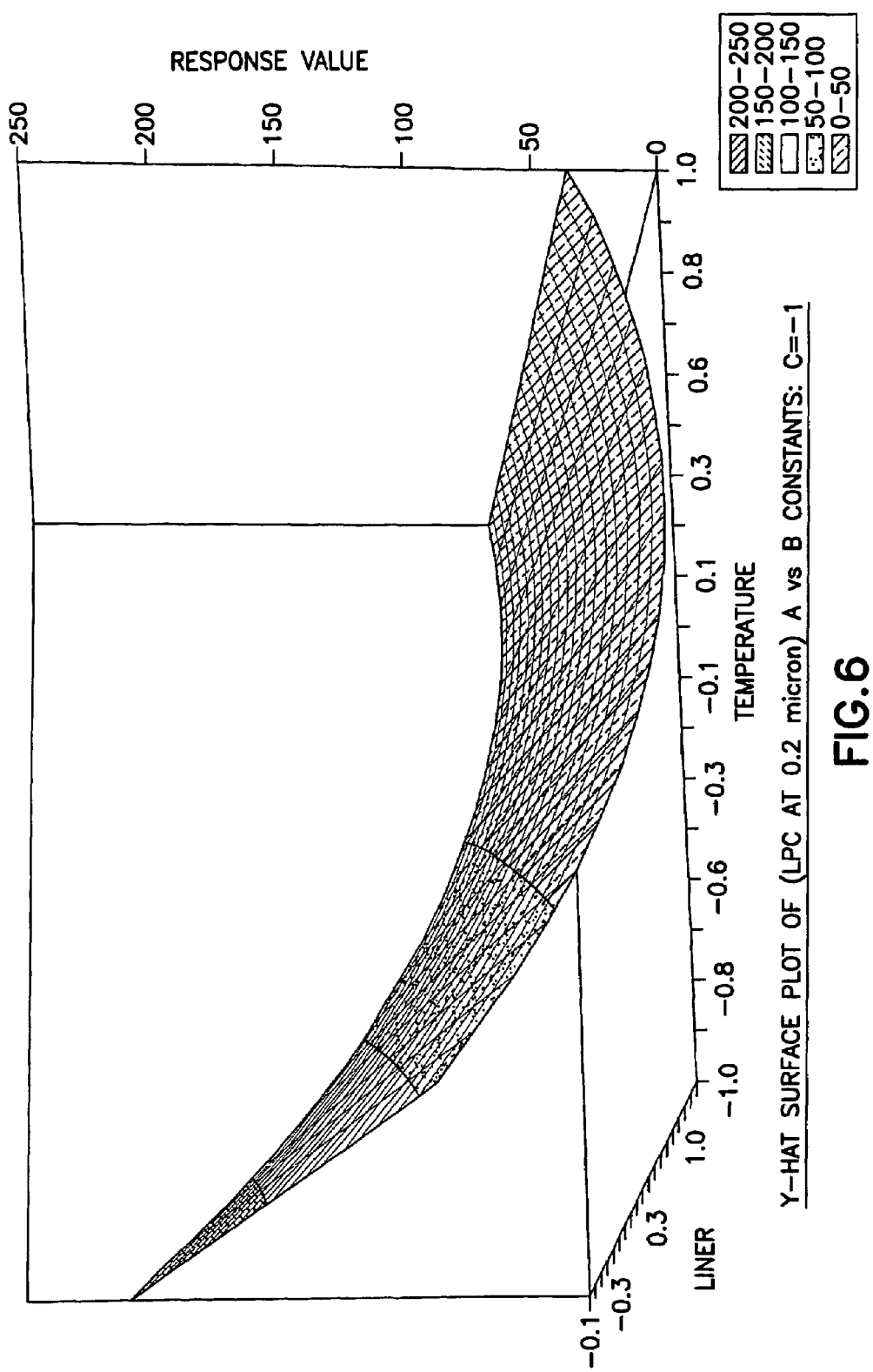
FIG. 6 is a calculated plot, based on actual data, showing how a particle count varies with heat treatment temperature for a number of liners held at selected temperatures for about 95 hours.

FIG. 6 is a calculated plot showing how a particle count varies with heat treatment temperature for a number of liners held at a selected temperature for 95 hours. FIG. 6 is a plot generated through the same techniques used in regard to FIG. 4: fifteen PTFE liners, five from three different lots, were used and the resultant data from different temperatures and liner lots were determined and placed into a program that used the data to determine the plot shown in FIG. 6. FIG. 6 shows that particle count varies with temperate and liner lot.

Figure 7:
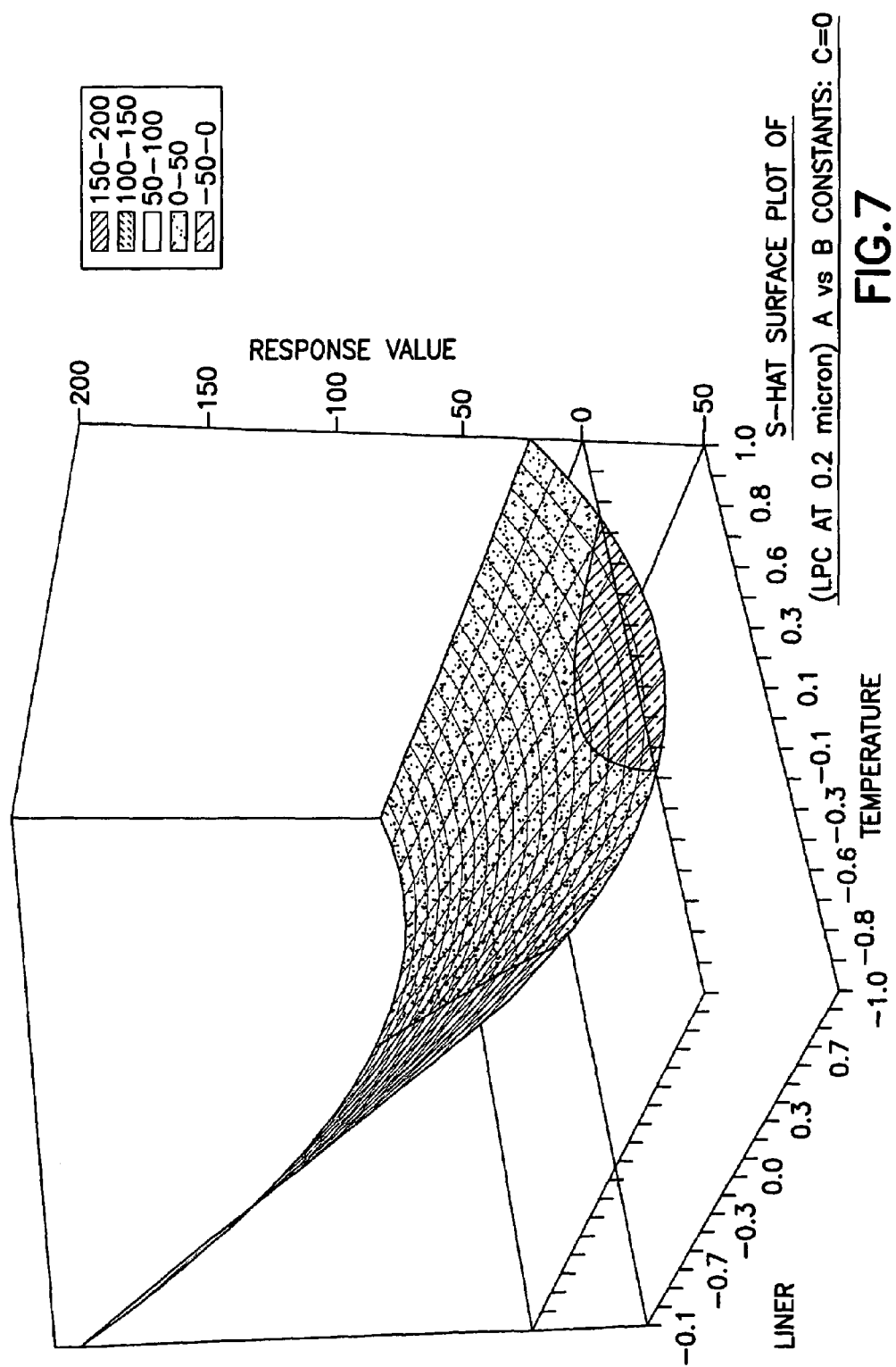
FIG. 7 is a calculated plot, based on actual data, showing how a standard deviation of a particle count varies with heat treatment temperature for the liners of FIG. 6.

FIG. 7 is a calculated plot showing how a standard deviation of a particle count varies with heat treatment temperature for the liners used in FIG. 6. FIG. 7 shows that the standard deviation of particle count varies with temperature and liner lot.

Figure 8:
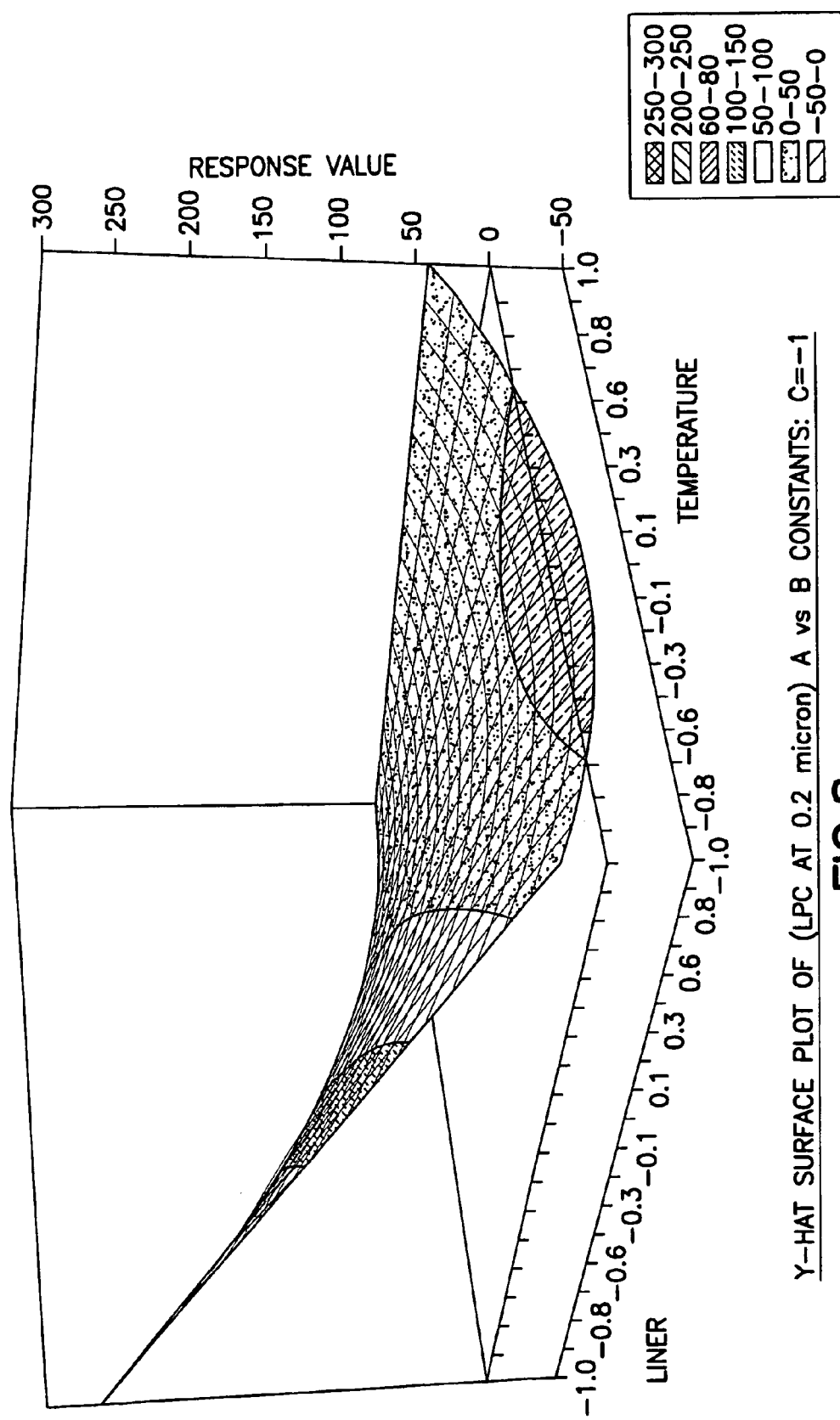
FIG. 8 is a calculated plot, based on actual data, showing how a particle count varies with heat treatment temperature for a number of liners held at selected temperatures for 170 hours.
Figure 9:
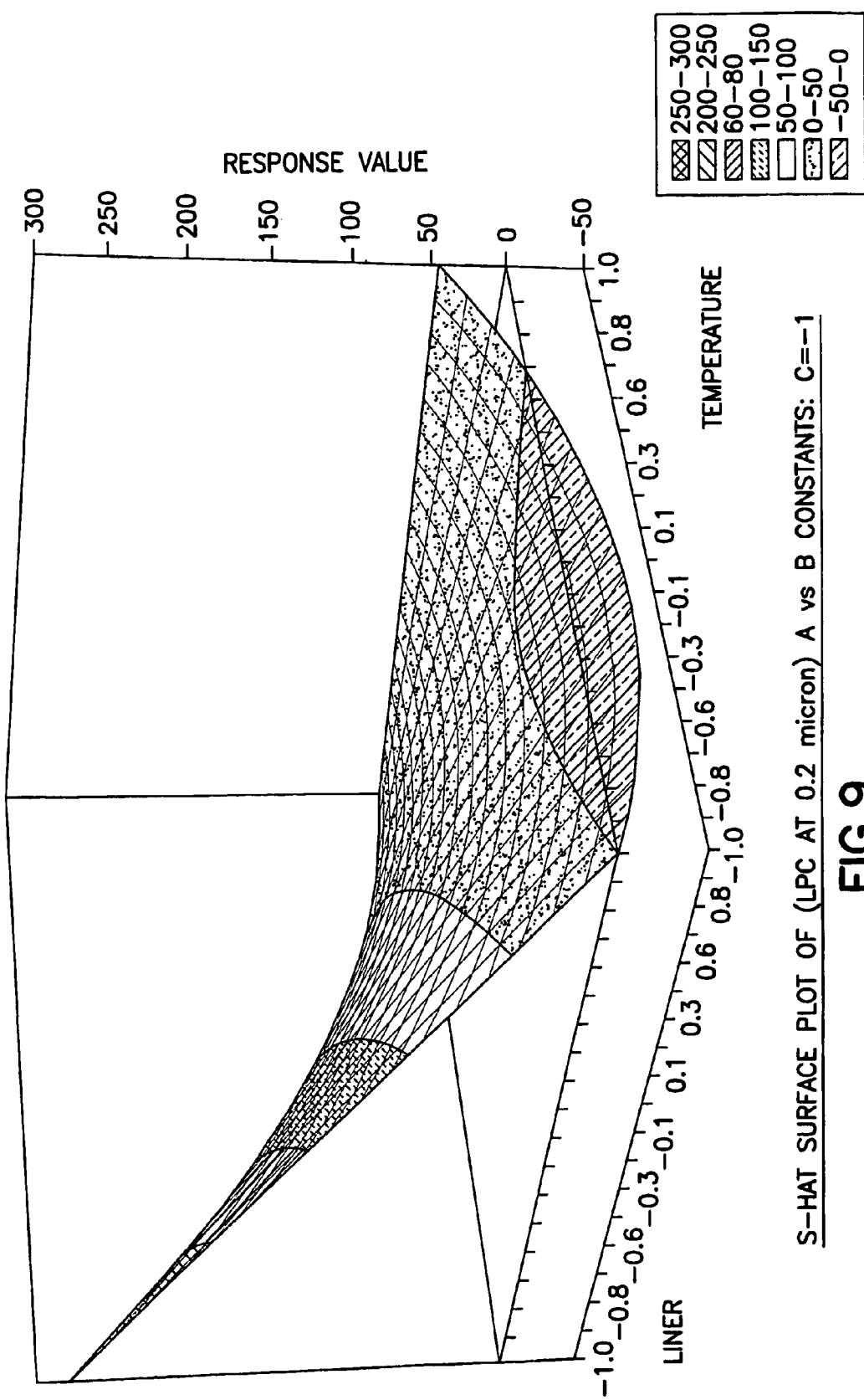
FIG. 9 is a calculated plot, based on actual data, showing how a standard deviation of a particle count varies with heat treatment temperature for the liners of FIG. 8.

FIG. 8 is a plot calculated through techniques used to determine FIGS. 4 and 6 but based on a number of liners held at a selected temperature for 170 hours. It should be noted that the negative values of particle count are calculated and not observed. FIG. 9 is a plot calculated through techniques used to determine FIGS. 5 and 7 but calculated using the liners of FIG. 8. Both FIGS. 8 and 9 show that particle count and the standard deviation thereof, respectively, vary with temperature and liner lot.

Thus, FIGS. 4 through 9 show that particle count and the standard deviation thereof, respectively, vary with temperature and liner lot. In order to determine an optimum temperature and time period, a regression analysis is used on the determined data. The regression analysis of the data used to determine FIGS. 4 through 9 indicates that, to minimize particle levels and standard deviation at 0.2 microns, the temperature should be 228 C for a time period of 100 hrs.

Figure 10:
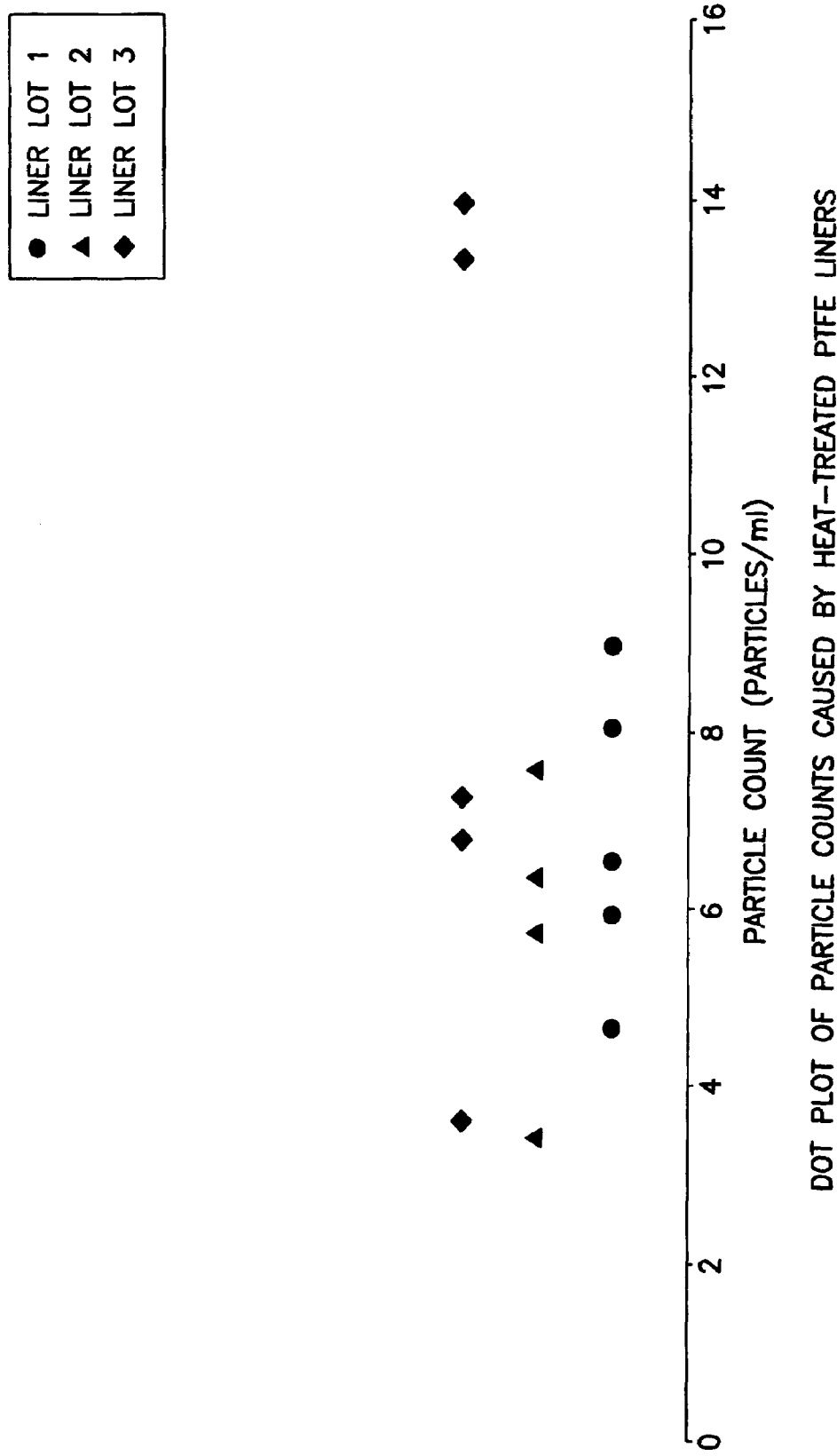
FIG. 10 is a dot plot of particle counts caused by heat treated PTFE liners.

These values were used for a confirmation experiment where three lots of liners were heated treated for 100 hrs at 228° C. The results of the testing (five inversions in photoresist, 16 hr rest with particle counting) are shown in FIG. 10. FIG. 10 is a dot plot of particle counts caused by heat treated PTFE liners. As can be seen by FIG. 10, the particle count and standard deviation thereof are small for heat treated PTFE liners. Thus, the present invention can reduce particle counts from about 250±100 particles/ml to about 8±2 particles/ml.

Note that liner lot variability, in terms of the standard deviation of the particle count, is also reduced. While there is still some variability, as the third liner lot has a few sample PTFE liners with particle counts greater than 10, the variability has been markedly decreased.

It is to be understood that the embodiments and variations shown and described herein are merely illustrative of the principles of this invention and that various modifications may be implemented by those skilled in the art without departing from the scope and spirit of the invention. In addition, the various assumptions made herein are for the purposes of simplicity and clarity of illustration, and should not be construed as requirements of the present invention.

What is claimed is:

1. A container adapted to contain a substance, the container comprising a circumscribing wall formed of a polytetrafluoroethylene film material having structural character modified by sustained application thereto of an elevated temperature in a range of between about 130° and 260° C. sufficient to reduce particle count character of said film material to a particle count of below 10 particles/ml of particles having a diameter of at least 0.2 micron, said circumscribing wall fabricated by welding a first sheet of said polytetrafluoroethylene film material to itself or to a second sheet of said polytetrafluoroethylene film material to define an interior volume adapted to surround said substance.

2. The container of claim 1 wherein the elevated temperature is above a glass transition temperature of the polytetrafluoroethylene film material.

3. The container of claim 1 wherein the application of the elevated temperature is for between about 20 hours and about 100 hours.

4. The container of claim 1 wherein the elevated temperature is about 228° C. and the application is for about 100 hours.

5. The container of claim 1, wherein the container comprises a spout.

6. The container of claim 5, adapted to fit into an overpack that is more rigid than the container.

7. The container of claim 6, wherein the overpack comprises polyethylene.

8. The container of claim 1, wherein the first sheet is welded to the second sheet with at least one welded joint or seam.

9. The container of claim 1, wherein the polytetrafluoroethylene film material is substantially non-shedding.

10. The container of claim 1 wherein the substance comprises a liquid.

11. The container of claim 1 wherein the substance comprises a powder.

12. The container of claim 1 wherein the substance comprises a semiconductor processing substance.

13. The container of claim 1, containing a semiconductor processing substance.

14. The container of claim 1, containing photoresist.

15. The container of claim 1, wherein the polytetrafluoroethylene film material is substantially contaminant-free.

16. The container of claim 1, wherein said particle count character is reduced a factor greater than 10 by said elevated temperature application.

17. The container of claim 1, containing a substantially contaminant-free substance.

18. The container of claim 1, wherein the welded polytetrafluoroethylene film material forms a four-sided, two-dimensional bag, and the bag comprises a spout.

19. The container of claim 1, wherein said structural character modified by application of elevated temperature effects is sufficient to reduce the particle count character of said film material by a factor greater than 10.

20. A container comprising:
a circumscribing wall formed of a polytetrafluoroethylene film material having structural character modified by sustained application thereto of an elevated temperature in a range of between about 130° and 260° C. for a sufficient time to reduce said particle count character by a factor greater than 10, said circumscribing wall fabricated by welding a first sheet of said polytetrafluoroethylene film material to itself or to a second sheet of said polytetrafluoroethylene film material to define an interior volume adapted to surround a substance; and
a spout affixed to the first sheet of said polytetrafluoroethylene film material.

21. The container of claim 20, containing a substantially contaminant-free substance, wherein said first sheet and said second sheet film has a particle count of below 10 particles/ml of particles having a diameter of 0.2 micron.

22. The container of claim 20, wherein the welded polytetrafluoroethylene film material forms a four-sided, two-dimensional bag.

* * * * *

UNITED STATES PATENT AND TRADEMARK OFFICE
CERTIFICATE OF CORRECTION

| | | |
|---|---|---|
| PATENT NO. | : 7,335,721 B2 | Page 1 of 1 |
| APPLICATION NO. | : 11/452153 | |
| DATED | : February 26, 2008 | |
| INVENTOR(S) | : Michele J. Alberg | |

It is certified that error appears in the above-identified patent and that said Letters Patent is hereby corrected as shown below:

Column 8, line 60 (claim 21), "mi of particles" should be -- ml of particles --.

Signed and Sealed this

Seventeenth Day of June, 2008

JON W. DUDAS
*Director of the United States Patent and Trademark Office*